(12) United States Patent
Suzuki

(10) Patent No.: US 6,893,031 B2
(45) Date of Patent: May 17, 2005

(54) FOLDING STROLLER (75) Inventor: Yoshiyuki Suzuki, Tokyo-To (JP)

(73) Assignee: Combi Corporation, Tokyo-to (JP)

(*) Notice: Subject to any disclaimer, the term of this patent is extended or adjusted under 35 U.S.C. 154(b) by 42 days.

(21) Appl. No.: 10/086,448

(22) Filed: Mar. 4, 2002

(65) Prior Publication Data
US 2002/0121753 A1 Sep. 5, 2002

(30) Foreign Application Priority Data
Mar. 5, 2001 (JP) ........................................ 2001-060216

(51) Int. Cl.⁷ ............................................... B62B 7/06
(52) U.S. Cl. .................... 280/47.36; 280/642; 280/647; 280/650
(58) Field of Search ................................ 280/642, 643, 280/644, 647, 648, 649, 650, 47.36, 47.371

(56) References Cited

U.S. PATENT DOCUMENTS

| 4,435,012 A | * | 3/1984 | Kassai ................... 297/354.12 |
| 4,616,844 A | * | 10/1986 | Kassai ........................ 280/650 |
| 4,779,879 A | * | 10/1988 | Kassai ...................... 280/47.36 |
| 4,832,361 A | * | 5/1989 | Nakao et al. ................ 280/642 |
| 4,906,017 A | * | 3/1990 | Kassai ......................... 280/642 |
| 5,029,886 A | * | 7/1991 | Takahashi et al. ...... 280/93.504 |
| 5,056,805 A | * | 10/1991 | Wang ........................ 280/47.36 |
| 5,195,770 A | * | 3/1993 | Ishikura ....................... 280/648 |
| 5,257,799 A | * | 11/1993 | Cone et al. ................. 280/642 |
| 5,513,864 A | * | 5/1996 | Huang ...................... 280/47.36 |
| 5,845,924 A | * | 12/1998 | Huang ......................... 280/642 |
| 6,073,945 A | * | 6/2000 | Cheng ...................... 280/47.36 |
| 6,102,432 A | * | 8/2000 | Cheng ......................... 280/642 |
| 6,116,624 A | * | 9/2000 | Hu ......................... 280/47.371 |
| 6,561,536 B2 | | 5/2003 | Suzuki |

FOREIGN PATENT DOCUMENTS

| EP | 0 997 367 | 5/2000 |
| SG | 99388 | 10/2003 |

* cited by examiner

Primary Examiner—Christopher P. Ellis
Assistant Examiner—Kelly E Campbell
(74) Attorney, Agent, or Firm—Wenderoth, Lind & Ponack, L.L.P.

(57) ABSTRACT

A stroller has a body structure adapted to be unfolded into an unfolded state for use, and to be folded into a folded state. A handle is supported on the body structure for forward and backward turning. The handle is set in either a backward-inclined position for a back-faced pushing mode or a forward-inclined position for a front-faced pushing mode. A handle locking mechanism locks the handle in the backward-inclined position for the back-faced pushing mode via a stopping member and a back stopping projection that engages with the stopping member. When the body structure is folded and armrests are turned upwardly from a working position, the stopping projection, which is fixed to the armrest, turns relative to the stopping member and an end part of the stopping projection is located with its major axis extended perpendicularly to an axis of the handle, and with a part thereof lying in a groove. When the stroller is folded, the end part engages with a stepped part formed in the groove to restrain the stopping member from upward movement, i.e. movement in an unlocking direction.

21 Claims, 10 Drawing Sheets

FOLDING STROLLER

BACKGROUND OF THE INVENTION

1. Field of the Invention

100011 The present invention relates to a folding stroller and, more particularly, to a folding stroller provided with a handle adapted to be set at either a back position that enables a person to push the stroller by the handle in a back-faced pushing mode in which the person faces a back of a baby on the stroller, or a front position that enables a person to push the stroller by the handle in a front-faced pushing mode in which the person faces a front of a baby on the stroller.

2. Description of the Related Art

Generally, there have been proposed various folding strollers for carrying a baby outdoors for walking and shopping. Those folding strollers are foldable, when necessary, to facilitate storing or carrying the same, and are provided with a handle that can be set at a back position or a front position. A person is able to push the stroller by the handle either in a back-faced pushing mode in which the person faces a back of a baby on the stroller when the handle is set at the back position, or in a front-faced pushing mode in which a person pushing the stroller by the handle faces a front of a baby on the stroller when the handle is set at the front position.

In the stroller provided with the handle that can be turned between the back position for the back-faced pushing mode and the front position for the front-faced pushing mode, the handle is supported for forward and backward turning on a body structure of the stroller, the handle can be unlocked by operating a remote control device held on the handle, and the handle can be set at either the back position behind a seat supported on the body structure or the front position in front of the seat.

If the remote control device is operated accidentally in a state where the stroller is folded, the handle is unlocked and, consequently, the body structure falls forward or backward.

SUMMARY OF THE INVENTION

The present invention has been made in view of the foregoing problem and it is therefore an object of the present invention to provide a folding stroller adapted to be set at either a back position for a back-faced pushing mode or a front position for a front-faced pushing mode, and adapted to prevent accidental unlocking of a handle when the stroller is folded.

The present invention provides a stroller including a body structure adapted to be unfolded into an unfolded state for use, and to be folded into a folded state; a handle supported on the body structure for forward and backward turning, and adapted to be set in either a backward-inclined position for a back-faced pushing mode or a forward-inclined position for a front-faced pushing mode; and a handle locking mechanism for locking the handle in either a state for the back-faced pushing mode or a state for the front-faced pushing mode; wherein the body structure can be folded and unfolded with the handle locked on the body structure in the state for the back-faced pushing mode, and the handle locking mechanism includes a mechanism that permits unlocking of the handle when the body structure is unfolded and inhibits unlocking of the handle when the body structure is folded.

In the stroller according to the present invention, it is preferable that the handle locking mechanism includes a stopping projection formed on an outer side surface of the body structure, and a stopping member provided with a groove adapted to engage with the stopping projection, supported on the handle for sliding along an axis of the handle and biased in a locking direction to engage the stopping projection in the groove of the stopping member. The stopping projection engaged in the groove of the stopping member turns relative to the stopping member as a condition of the body structure changes between a folded state and an unfolded state, and as a condition of engagement of the stopping projection and the groove of the stopping member changes according to an angular position of the stopping projection relative to the groove of the stopping member.

It is preferable that the stopping projection has a cylindrical shaft part engaged for turning in the groove of the stopping member, and an end part formed on an end of the shaft part so as to extend in a direction parallel to an axis of the handle when the stopping projection is at a first position corresponding to when the body structure is in the unfolded state, and so as to extend in a direction perpendicular to the axis of the handle when the stopping projection is at a second position corresponding to when the body structure is in the folded state. And, the groove of the stopping member has a stepped part that comes into contact with the end part of the stopping projection to restrain the stopping member from movement in an unlocking direction when the stopping projection is at the second position.

It is preferable that the end part has an elliptical shape.

It is preferable that the stroller further includes an operating device on the handle, and a connecting member extending along the handle and having one end connected to the stopping member and another end connected to the operating device, wherein the connecting member is to be pulled up by operating the operating device to move the stopping member, biased in the locking direction, in an unlocking direction opposite to the locking direction.

According to the present invention, since the stroller is provided with the mechanism that permits unlocking of the handle when the body structure is unfolded and inhibits unlocking of the handle when the body structure is folded, it is possible to prevent a forward or backward fall of the body structure when the handle is unlocked accidentally, owing to some mistake, when the body structure is folded.

DETAILED DESCRIPTION OF THE PREFERRED EMBODIMENTS

Preferred embodiments of the present invention will be described with reference to the accompanying drawings.

Figure 1:
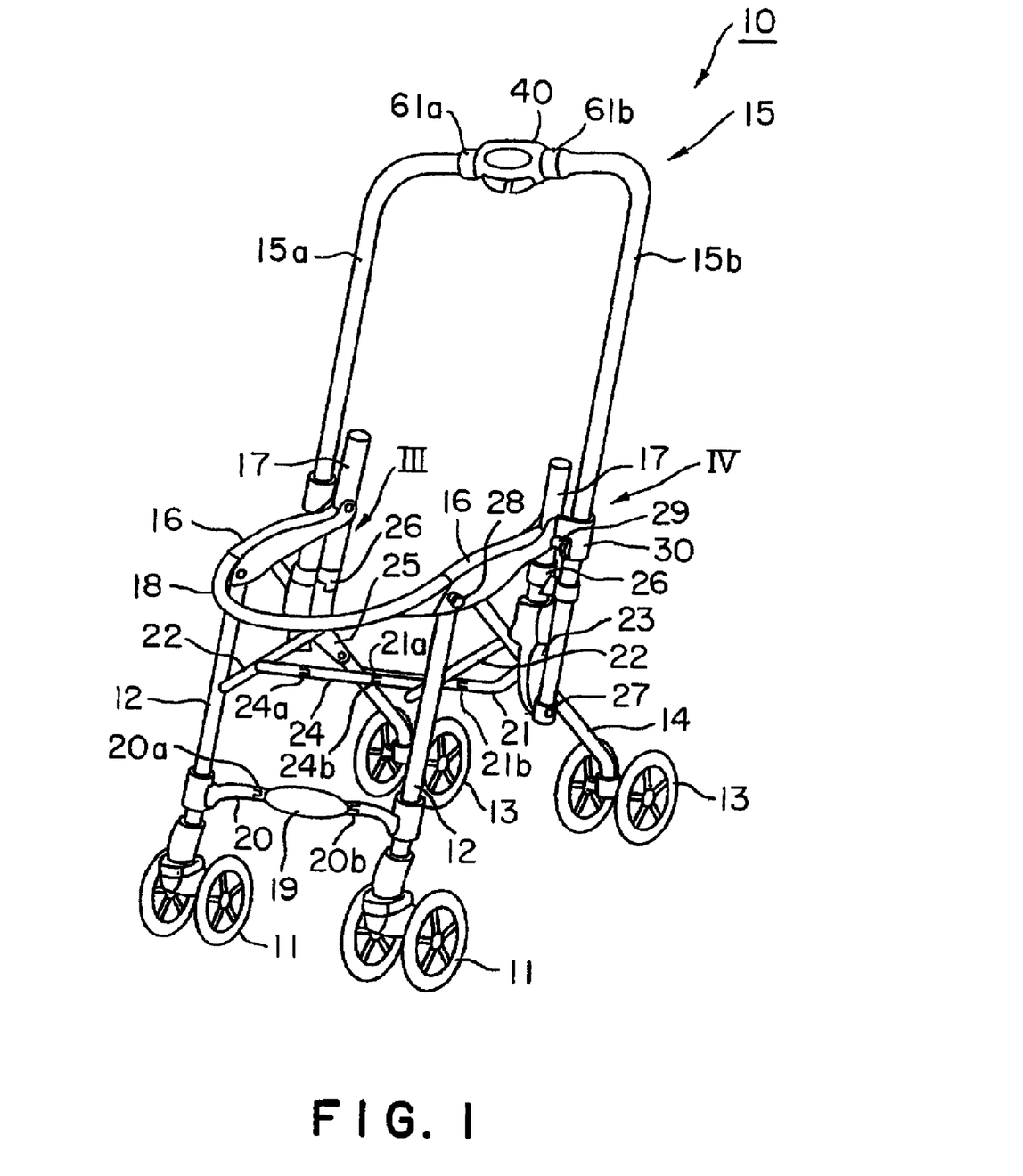
FIG. 1 is a schematic perspective view of a stroller in a preferred embodiment of the present invention.
Figure 2:
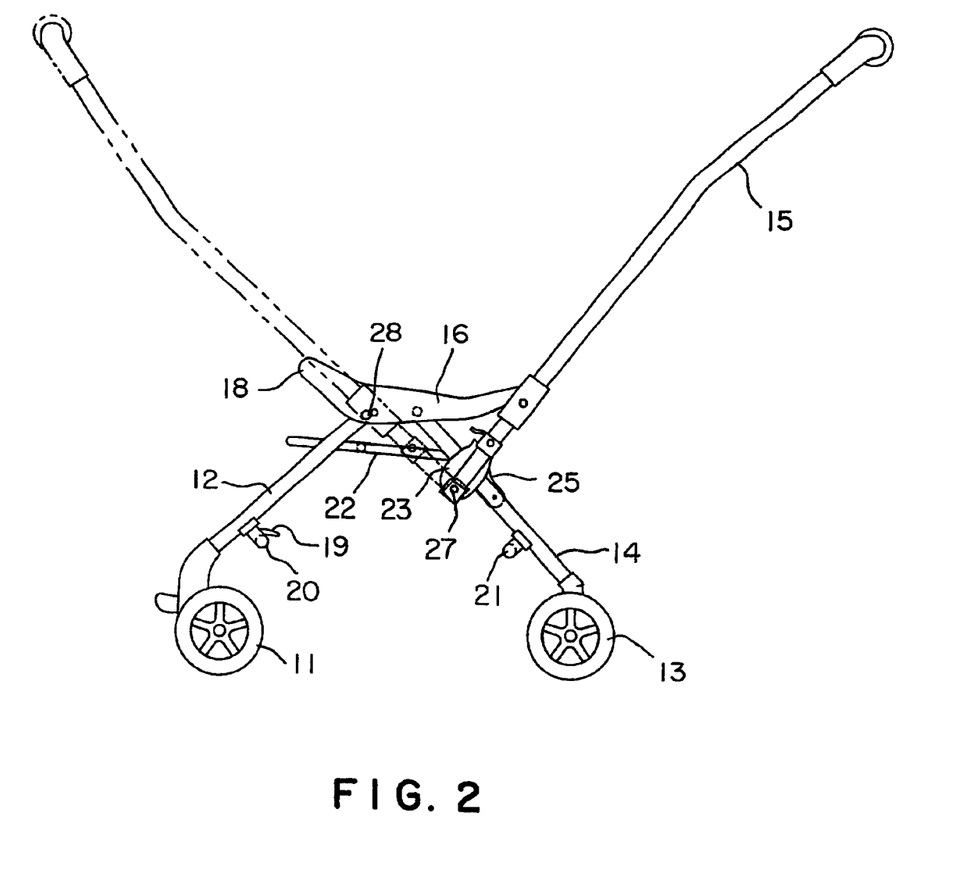
FIG. 2 is a schematic side elevational view of the stroller shown in FIG. 1.

Referring to FIGS. 1 and 2, a stroller 10 in a preferred embodiment of the present invention includes a pair of front legs 12 respectively provided with front wheels 11, a pair of back legs 14 respectively provided with back wheels 13, and a pair of armrests 16. Upper end parts of the front legs 12 and the back legs 14 are joined pivotally to the armrests 16. An arcuate, flexible guard arm 18 is extended across and detachably joined to front ends of the armrests 16. Parallel right and left pipes 17 are pivotally joined to back ends of the armrests 16, respectively.

A front connecting bar 20 provided with a footrest 19 is extended between the front legs 12. A back connecting bar 21 is extended between the back legs 14. Side connecting bars 22 have front ends pivotally joined to middle parts of the front legs 12, respectively, and back ends pivotally joined to back leg support members 23 fastened to lower parts of the pipes 17. An upper connecting bar 24 interconnects right and left side connecting bars 22.

The front legs 12, the back legs 14, the armrests 16, the pipes 17, the connecting bars 20, 21, 22 and 24, and the leg support members 23 constitute a foldable body structure. A fabric seat on which a baby is seated, and a bag of mesh or the like are attached to the front legs 12 and the back legs 14, which are omitted in FIGS. 1 and 2 to facilitate understanding of a general constitution of the stroller 10.

A substantially U-shaped handle 15 has lower end parts joined pivotally by a shaft 27 to the back leg support members 23 fastened to the lower parts of right and left pipes 17 such that the handle 15 can be turned between a back position for a back-faced pushing mode indicated by continuous lines in FIG. 2, and a front position for a front-faced pushing mode indicated by two-dot chain lines in FIG. 2. The handle 15 has a right leg 15a, a left leg 15b and a remote-control device 40 connected to upper ends of the legs 15a and 15b by joints 61a and 61b. The remote-control device 40 is operated by a user to unfold the stroller, to lock the handle 15 at a desired position, and to unlock the handle 15.

Figure 3:
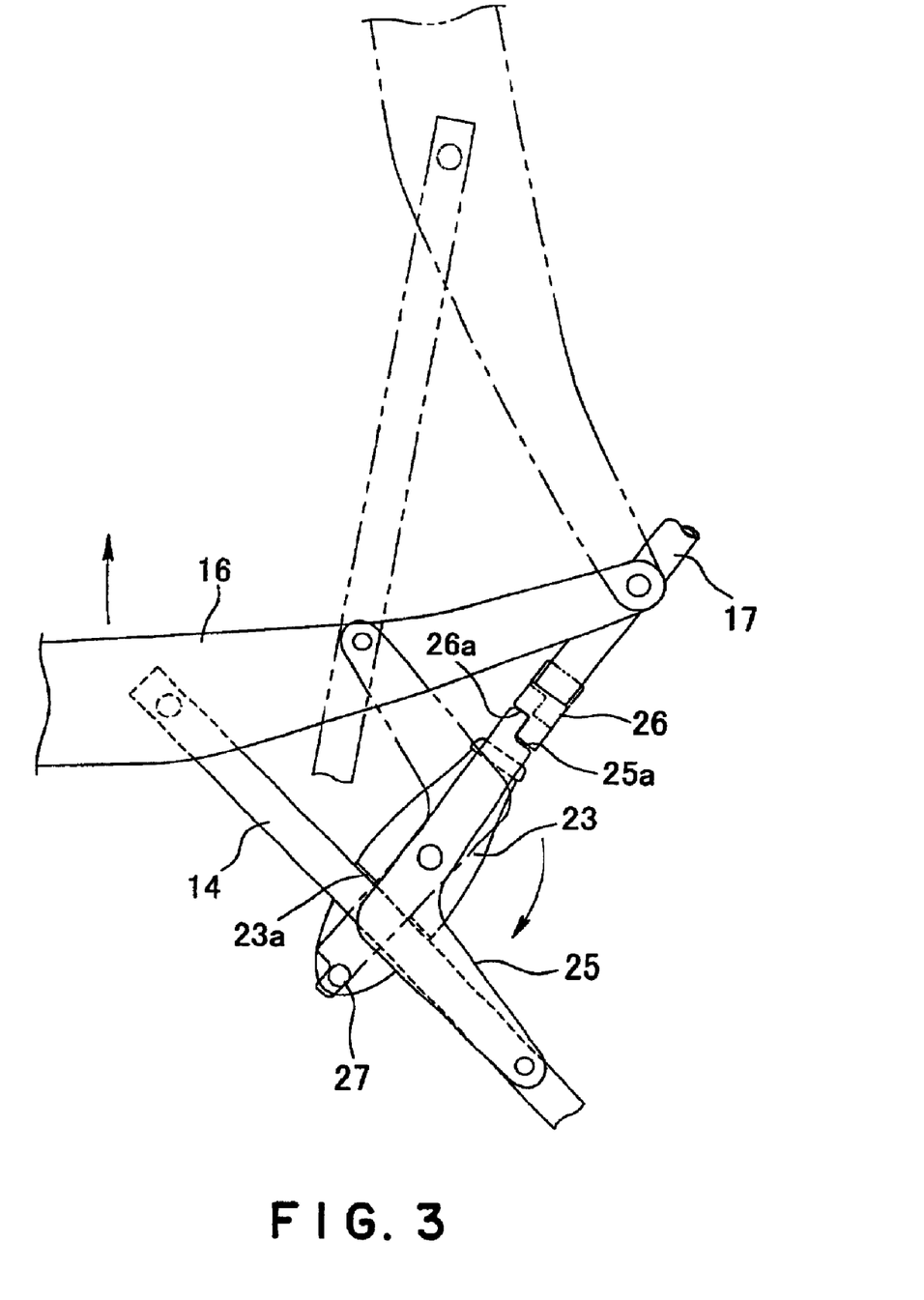
FIG. 3 is an enlarged, schematic, fragmentary side elevational view of a part III in FIG. 1.

Referring to FIG. 3, an L-shaped bracket 25 has a middle part pivotally joined to back leg support member 23, and a lower end part pivotally joined to back leg 14. A stepped part 25a is formed in a free end part of the bracket 25. The stepped part 25a is engaged with a stepped part 26a formed in a locking member 26 for locking together the back leg 14 and pipe 17. The locking member 26 is slidably provided on the pipe 17 and is moved axially along the pipe 17 by the remote-control device 40, which will be described later. The back leg support member 23 is provided with a stepped part 23a. The stepped part 23a is pressed against the back leg 14 when the stroller is unfolded to hold the back leg 14 in an unfolded state.

Figure 10:
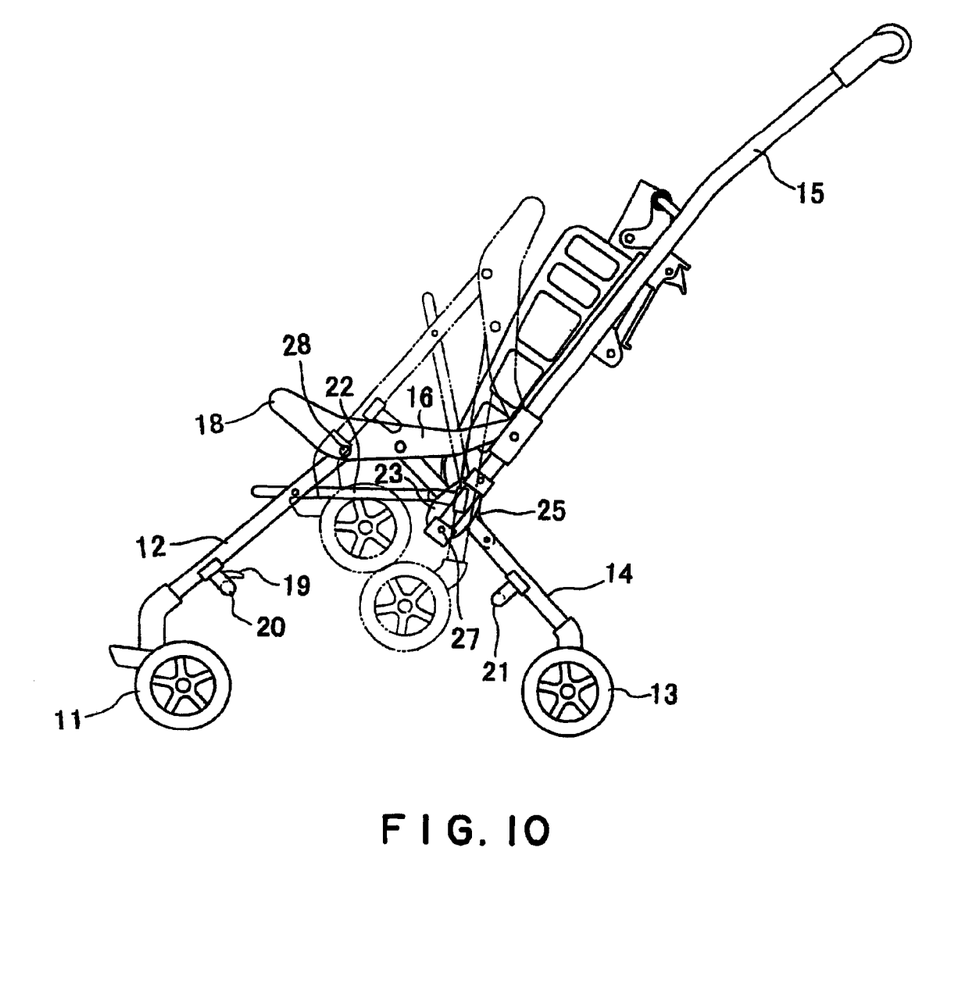
FIG. 10 is a side elevational view of the stroller shown in FIG. 1 folded in two.

When the stepped part 26a of the locking member 26 is engaged with the stepped part 25a of the L-shaped bracket 25 as shown in FIG. 3, the bracket 25 locks the back leg 14 and the pipe 17 together to hold the stroller in the unfolded state for use. When the locking member 26 is raised to a position indicated by two-dot chain lines by operating the remote-control device 40 as shown in FIGS. 3 and 10, the bracket 25 is released from the locking member 26. Consequently, the back leg 14, armrest 16, and front leg 12 can be turned to positions indicated by two-dot chain lines, so that the stroller can be folded so as to facilitate carrying the same.

Figure 4:
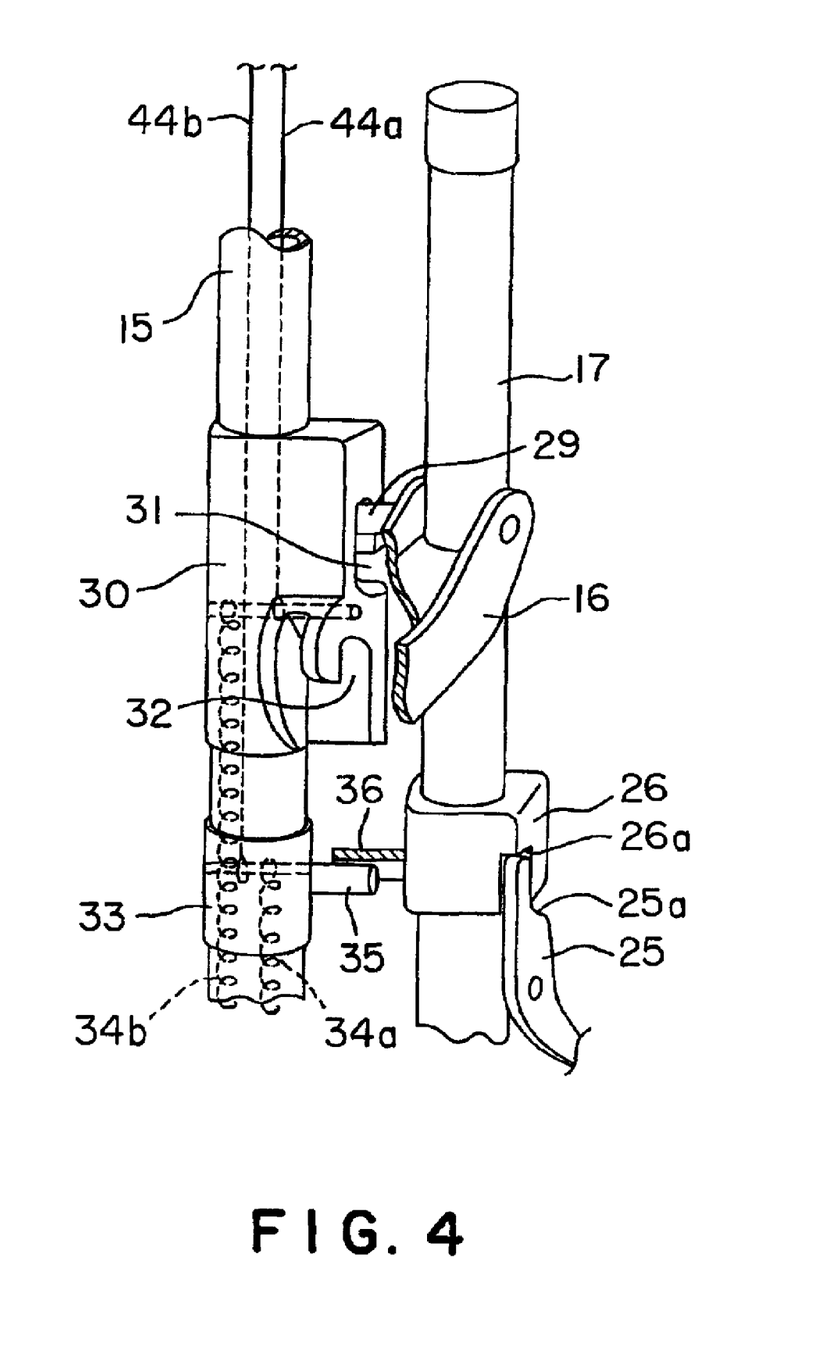
FIG. 4 is a fragmentary perspective view of a part IV in FIG. 1.
Figure 5:
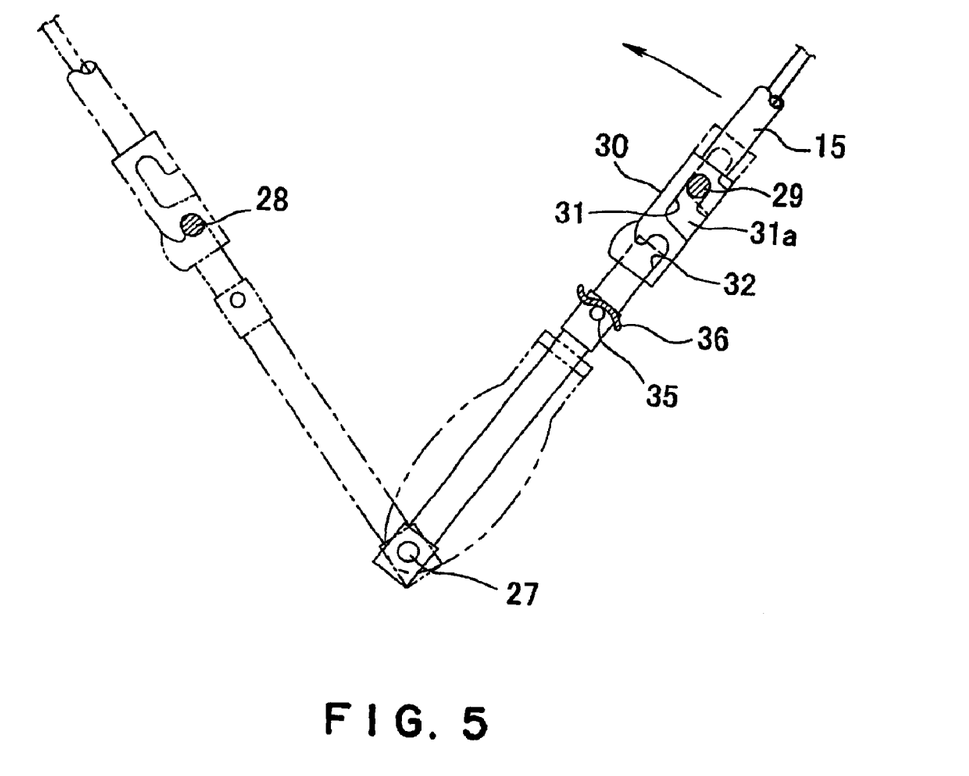
FIG. 5 is a view of assistance in explaining an operation for turning a handle included in the stroller shown in FIGS. 1 and 2.

As shown in FIG. 1, a front stopping projection 28 and a back stopping projection 29 are attached to front and back end parts, respectively, of an outer side surface of each armrest 16 so as to project laterally. As shown in FIGS. 4 and 5, stopping members 30 are provided on the handle 15 so as to be axially slidable on the handle 15. As shown in FIG. 5, each stopping member 30 has a first groove 31 and a second groove 32 formed so as to open toward pipe 17 in a surface facing the pipe 17. The first groove 31 has a substantially L-shape and has an open end 31a opening toward a back. The second groove 32 is formed below the first groove 31 and opens forwardly and downwardly. As shown in FIG. 4, the stopping member 30 is biased axially downwardly by a spring 34b, provided in the handle 15, for engagement.

The stopping projections 28 and 29 and the stopping members 30 (grooves 31 and 32) constitute a locking mechanism for locking the handle 15 at either the back position for the back-faced pushing mode or the front position for the front-faced pushing mode.

Figure 6:
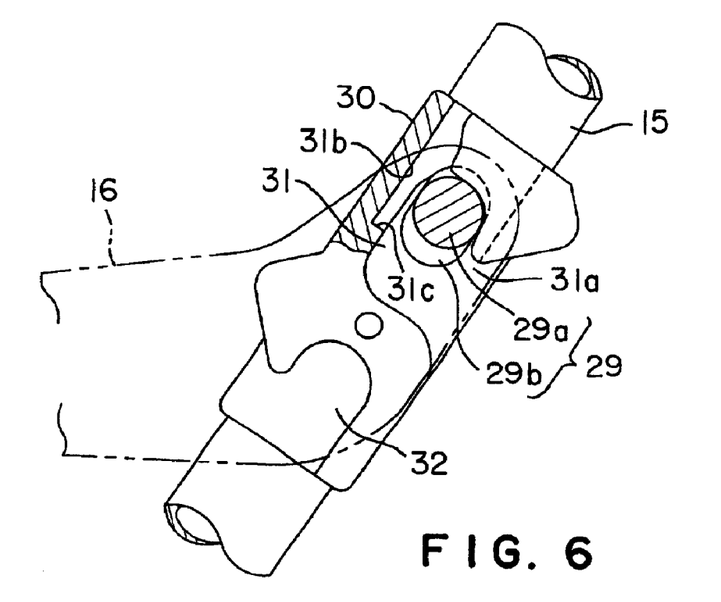
FIG. 6 is an enlarged, fragmentary sectional view of the handle of the stroller in a locked state, in which a stopping member and stopping projection are engaged, when the stroller is in an unfolded state.

When the remote-control device 40 is operated to pull up the stopping member 30 in an unlocking direction, and the handle 15 is turned to the back position, the back stopping projection 29 is received through the open end 31a in the first groove 31. Then, the stopping member 30 is moved axially downwardly to engage the back stopping projection 29 in the first groove 31 as shown in FIG. 6. Consequently, the handle 15 is fixedly held at the back position for the back-faced pushing mode as indicated by continuous lines in FIGS. 2 and 5. When the stopping member 30 is pulled upwardly, as indicated by chain lines, in an unlocking direction and the handle 15 is turned to the front position, the front stopping projection 28 is received in the second groove 32, the stopping member 30 is moved downwardly, and the handle 15 is held fixedly at the front position for the front-faced pushing mode as indicated by two-dot chain lines in FIGS. 2 and 5.

The body structure can be folded and unfolded with the handle 15 locked on the body structure, in which the back stopping projection 29 is engaged in the first groove 31 of the stopping member 30.

Figure 7:
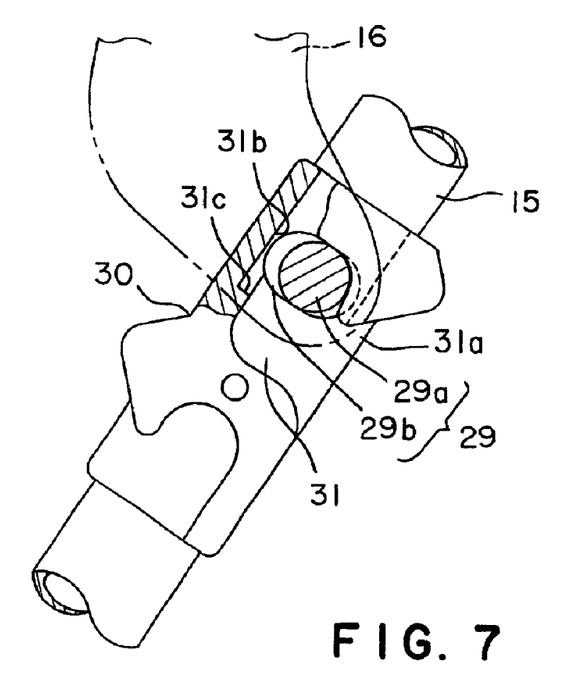
FIG. 7 is an enlarged, fragmentary sectional view of the handle of the stroller in a locked state, in which the stopping member and stopping projection are engaged, when the stroller is in a folded state, in which armrests are turned up.

The front stopping projection 28 is cylindrical. As shown in FIGS. 6 and 7, the back stopping projection 29 has a cylindrical shaft part 29a capable of being rotatably engaged in the first groove 31 of the stopping member 30, and an end part 29b formed at an extremity of the cylindrical shaft part 29a. FIGS. 6 and 7 are views of a part of the stroller 10 on a left side as viewed facing a front of the stroller 10 taken from inside of the body structure. The end part 29b is an elliptical part having a minor axis of a size equal to a diameter of the cylindrical shaft part 29a. A major axis of the elliptical end part 29b extends along an axis of the handle 15 when the body structure is unfolded and the stopping projection 29 is at a position shown in FIG. 6, and the end part 29b extends in a direction perpendicular to the axis of the handle 15 when the body structure is folded and the stopping projection 29 is at a position shown in FIG. 7. As shown in FIGS. 6 and 7, a groove 31b for receiving the end part 29b of the stopping projection 29 is formed in the first groove 31 of the stopping member 30 in which the stopping projection 29 is engaged, with the groove 31b being formed in a part of a side wall extending along the axis of the handle 15. A step 31c that engages with the end part 29b of the stopping projection 29, at a position shown in FIG. 7, when the body structure is folded to stop axial upward movement of the stopping member 30 along the axis of the handle 15 in the unlocking direction is formed in one end of the first groove 31.

When unfolded (FIG. 6) or folded (FIG. 7), in a state where the stopping projection 29 is engaged in the first groove 31 of the stopping member 30 and the stopping member 30 is biased downwardly, i.e., in a locking direction, along the axis of the handle 15, the stopping projection 29 engaged in the first groove 31 of the stopping member 30 turns relative to the stopping member 30, and a condition of engagement of the stopping projection 29 and the first groove 31 of the stopping member 30 changes according to an angular position of the stopping projection 29 relative to the groove 31 of the stopping member 30.

When the stroller is unfolded and the armrests 16 are held at a working position, the major axis of the end part 29b of each stopping projection 29 extends parallel to the axis of the handle 15, and hence the handle 15 can be unlocked. Then, the stopping member 30 can be pulled up in the unlocking direction by operating the remote-control device 40 and, when necessary, the handle 15 can be unlocked and can be turned from the back position for the back-faced pushing mode to the front position for the front-faced pushing mode.

When the body structure is folded and the armrests 16 are turned upwardly from the working position, the stopping member 29 turns relative to the stopping member 30 and the end part 29b of the stopping projection 29 is located with its major axis extended perpendicularly to the axis of the handle 15, and with a part thereof lying in the groove 31b as shown in FIG. 7. When the remote-control device 40 is operated wrongly to pull up the stopping member 30 to change the position of the handle 15 in a state where the stroller is folded, the end part 29b engages with the stepped part 31c to restrain the stopping member 30 from upward movement (movement in the unlocking direction). Thus, the handle 15 is prevented from being accidentally unlocked due to wrong upward movement of the stopping member 30, and hence a forward or backward fall of the body structure can be surely prevented. In other words, the handle 15 can only be unlocked from the body structure when the body structure is in an unfolded state.

Referring to FIG. 4, an unlocking member 33 is provided on a part of the handle 15 extending below the stopping member 30 so as to be operated by the remote-control device 40 for sliding motion along the handle 15. The unlocking member 33 is biased downwardly (in a locking direction) by a spring 34a extended in the handle 15. An unlocking rod 35 projects outwardly from the unlocking member 33. An operating plate 36 projects outwardly from a locking member 26, mounted on pipe 17, parallel to the handle 15 so as to extend over the unlocking rod 35. When the unlocking member 33 provided with the unlocking rod 35 is pulled upwardly, the unlocking rod 35 comes into engagement with the operating plate 36 and pushes the locking member 26 up to release the bracket 25.

The remote-control device 40 for locking the body structure in either a folded state or an unfolded state, and for locking and unlocking the handle 15, will be described with reference to FIGS. 8 and 9.

Figure 8:
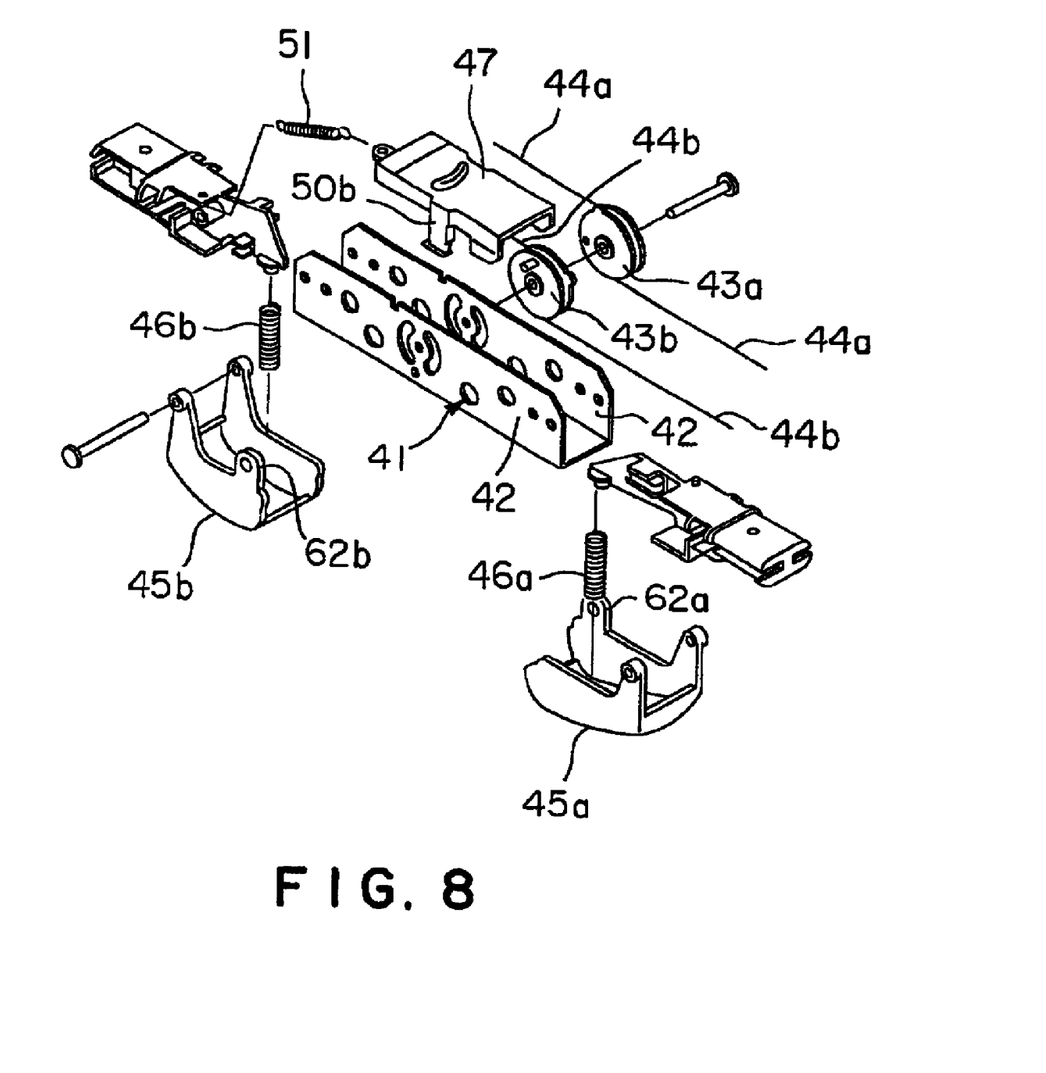
FIG. 8 is an exploded perspective view of a remote-control device shown in FIG. 1.

Referring to FIG. 8 showing the remote-control device 40 in an exploded perspective view, a frame 41 having a shape of a channel is connected to the handle 15 by the joints 61a and 61b as shown in FIG. 1. The frame 41 has opposite side walls 42. Two pulleys 43a and 43b are held for rotation on the side walls 42. Wire cables 44a are connected to diametrically opposite parts of the pulley 43a, respectively, and wire cables 44b are connected to diametrically opposite parts of the pulley 43b, respectively. The wire cables 44a and 44b are extended through the handle 15. The wire cables 44a connected to the pulley 43a are connected to the stopping members 30, respectively. The wire cables 44b connected to the pulley 43b are connected to the unlocking members 33, respectively (FIG. 4).

As shown in FIG. 8, operating levers 45a and 45b having a U-shaped cross section have base ends pivotally connected to the frame 41. The operating levers 45a and 45b are biased by springs 46a and 46b, respectively, so that extremities of the operating levers project from the frame 41. The operating levers 45a and 45b have driving projections 62a and 62b connected to the pulleys 43a and 43b, respectively. A locking plate 47 is provided on the frame 41 so as to slide along upper edges of the side walls 42 of the frame 41. As shown in FIGS. 9(a) to 9(c), a guide slot 48 is formed in an end part of the locking plate 47 and a stopping pin 49 provided in the frame 41 is engaged in the guide slot 48 to limit range of movement of the locking plate 47. Opposite side walls of the locking plate 47 are provided with restricting parts 50a and 50b, respectively. The restricting parts 50a and 50b are able to come into engagement with upper ends of the driving projections 62a and 62b, respectively.

Figure 9A:
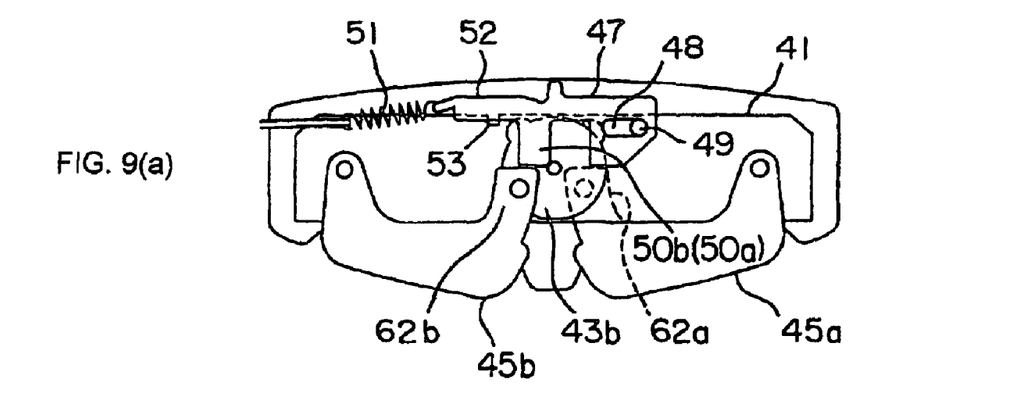
FIGS. 9(a)–9(c) are views of assistance in explaining operation of the remote-control device shown in FIG. 8.

In a state shown in FIG. 9(a) where the locking plate 47 is operated, the locking plate 47 is biased by a return spring 51 in a restricting direction, and lower end parts of the restricting parts 50a and 50b are at operating positions on the upper ends of the driving projections 62a and 62b of the operating levers 45a and 45b, respectively, to exercise a locking function. In this state, the driving projections 62a and 62b cannot be raised even if an operating force is applied to the operating levers 45a and 45b, so that safety of the remote-control device 40 is assured.

Figure 9B:
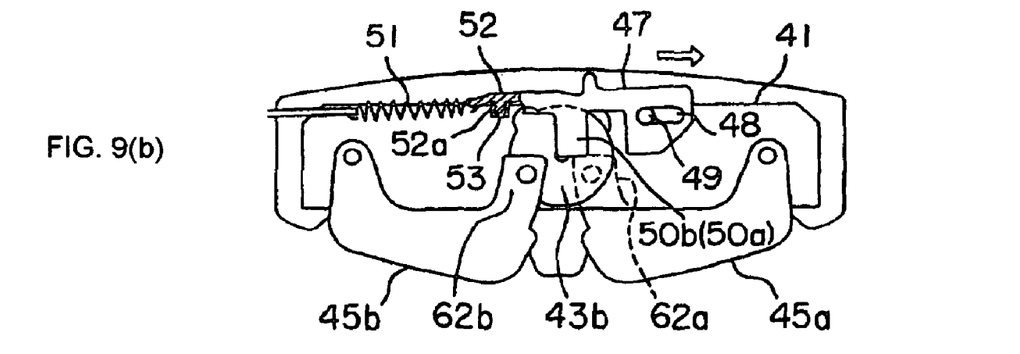

When the locking plate 47 is moved in a direction of the arrow as shown in FIG. 9(b), the restricting parts 50a and 50b are shifted from the positions on the upper ends of the driving projections 62a and 62b of the operating levers 45a and 45b to neutral positions, respectively. Thus, the restricting parts 50a and 50b are moved away from the driving projections 62a and 62b. A base end part of the locking plate 47 is biased downwardly by the return spring 51. Therefore, a stopping projection 52a formed on a top wall 52 of the operating plate 47 is engaged in a groove 53 formed in an upper edge of the frame 41 to hold the locking plate 47 temporarily at an open position when the locking plate 47 is moved in the direction of the arrow as shown in FIG. 9(b).

Figure 9C:
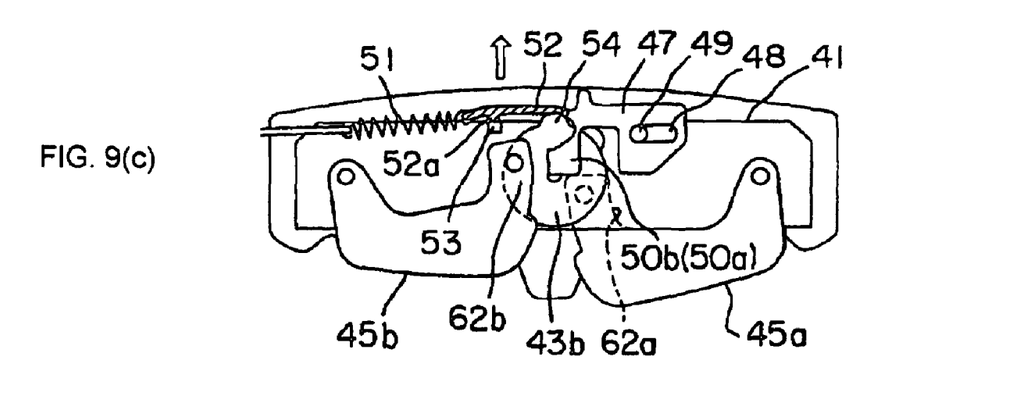

Referring to FIG. 9(c), when the operating lever 45a or 45b of the remote-control device 40, in the state shown in FIG. 9(b), is operated to raise the driving projection 62a or 62b, the pulley 43a or 43b is turned to pull the wire cables 44a or 44b for remote-control operation. When the pulley 43a or 43b is thus turned, projection 54 projecting from a circumference of the pulley 43a or 43b engages with the top wall 52 of the locking plate 47 to raise the operating plate 47. Consequently, the stopping projection 52a is disengaged from the groove 53. Therefore, when a force applied to the operating lever 45a or 45b is removed from the operating lever 45a or 45b, the locking plate 47 is returned automatically and instantly to its initial position to prevent accidental operations. Thus, remote operations for folding and unfolding the body structure and for locking and unlocking the handle 15 are possible.

The wire cables 44a pull the stopping members 30 along the axis of the handle 15 in the unlocking direction against resilience of springs 34a to unlock the handle 15 when the operating lever 45a is operated. Consequently, the handle 15 can be turned forward to the front position for the front-faced pushing mode or backward to the back position for the back-faced pushing mode.

When the operating lever 45b is operated after placing the handle 15 at the back position for the back-faced pushing mode, the wire cables 44b pull the unlocking members 33 against resilience of the springs 34a to pull up the locking members 26 via the unlocking rods 35 and the operating plates 36, whereby brackets 25 are released from the locking members 26. Consequently, the armrests 16, the front legs 12 and the back legs 14 can be turned upwardly to positions indicated by two-dot chain lines in FIGS. 3 and 10 to fold the body structure in two to facilitate carrying the stroller.

As shown in FIG. 1, the front connecting bar 20, the back connecting bar 21 and the upper connecting bar 24 are provided with joints 20a and 20b, joints 21a and 21b, and joints 24a and 24b, respectively, to make the front connecting bar 20, the back connecting bar 21 and the upper connecting bar 24 foldable. Outer parts 15a and 15b of the handle 15 can be turned forwardly on the joints 61a and 61b, respectively. When the stroller 10 is folded such that the front legs 12 and the back legs 14 extend parallel to each other, the joints 20a, 21a, 24a and 61a are aligned on a line, the joints 20b, 21b, 24b and 61b are aligned on a line, and these two lines are parallel.

Figure 11:
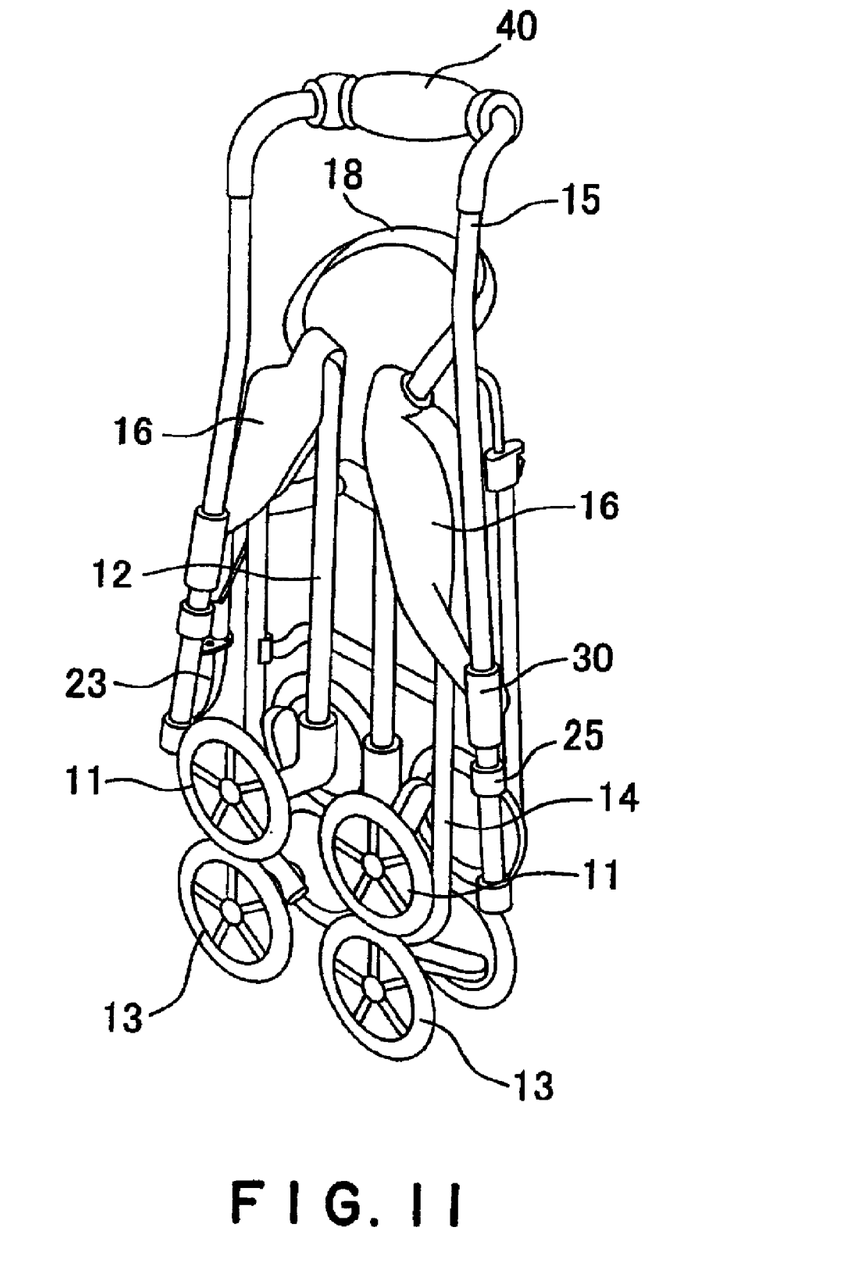
FIG. 11 is a schematic perspective view of the stroller shown in FIG. 1 folded in three.

When the outer parts 15a and 15b of the handle 15 are turned forwardly after folding the stroller 10 such that the front legs 12 and the back legs 14 are parallel to each other, respective outer parts 15a and 15b of the handle 15, the front connecting bar 20, the back connecting bar 21 and the upper connecting bar 24 are turned forwardly on the corresponding joints to fold the stroller 10 compactly in three as shown in FIG. 11.

What is claimed is:

1. A stroller comprising:
   a body structure adapted to be unfolded into an unfolded state, for use, and folded into a folded state;
   a handle supported on said body structure for forward and backward turning so as to be provided in either a backward-inclined position for a back-faced pushing mode or a forward-inclined position for a front-faced pushing mode; and
   a handle locking mechanism for locking said handle, to said body structure, in a state for the back-faced pushing mode or a state for the front-faced pushing mode, said handle locking mechanism including a stopping structure that permits unlocking of said handle from said body structure only when said body structure is in the unfolded state and inhibits unlocking of said handle from said body structure when said body structure is in the folded state even when said handle locking mechanism is actuated for unlocking said handle.

2. The stroller according to claim 1, wherein said body structure can be folded and unfolded with said handle being locked to said body structure in the state for the back-faced pushing mode.

3. The stroller according to claim 2, wherein said handle locking mechanism includes
   (i) a stopping projection provided on an outer surface of said body structure, and
   (ii) a stopping member having a groove that is adapted to engage said stopping projection, said stopping member being supported on said handle for sliding movement along an axis of said handle and being biased in a locking direction so as to allow said groove to engage said stopping projection,
   such that when said stopping projection is engaged in said groove said stopping projection turns relative to said stopping member as a condition of said body structure changes between the folded state and the unfolded state, and
   such that a condition of engagement of said stopping projection and said groove changes according to an angular position of said stopping projection relative to said groove.

4. The stroller according to claim 3, wherein said stopping projection includes
   (i) a shaft part, with said groove being adapted to engage said stopping projection by engaging said shaft part such that said shaft part turns relative to said stopping member, when said shaft part is engaged by said groove, as the condition of said body structure changes between the folded state and the unfolded state, and
   (ii) an end part, on an end of said shaft part, that is to extend in a direction parallel to the axis of said handle when said stopping projection is at a first position corresponding to when said body structure is in the unfolded state, and is to extend in a direction perpendicular to the axis of said handle when said stopping projection is at a second position corresponding to when said body structure is in the folded state, and
   said groove includes a stepped part that is to come into contact with said end part so as to restrain said stopping member from movement in an unlocking direction when said stopping projection is at the second position,
   with a combination of said end part and said stepped part corresponding to said structure that permits unlocking of said handle from said body structure only when said body structure is in the unfolded state and inhibits unlocking of said handle from said body structure when said body structure is in the folded state.

5. The stroller according to claim 4, wherein said end part is elliptical in shape.

6. The stroller according to claim 5, further comprising:
   an operating device on said handle; and
   a connecting member extending along said handle, said connecting member having one end connected to said stopping member and another end connected to said operating device,
   wherein said connecting member is operable to be pulled by said operating device so as to move said stopping member, biased in the locking direction, in an unlocking direction that is opposite to the locking direction.

7. The stroller according to claim 4, further comprising:
   an operating device on said handle; and
   a connecting member extending along said handle, said connecting member having one end connected to said stopping member and another end connected to said operating device,
   wherein said connecting member is operable to be pulled by said operating device so as to move said stopping member, biased in the locking direction, in an unlocking direction that is opposite to the locking direction.

8. The stroller according to claim 3, further comprising:
an operating device on said handle; and
a connecting member extending along said handle, said connecting member having one end connected to said stopping member and another end connected to said operating device,
wherein said connecting member is operable to be pulled by said operating device so as to move said stopping member, biased in the locking direction, in an unlocking direction that is opposite to the locking direction.

9. The stroller according to claim 1, further comprising:
an operating device for actuating said handle locking mechanism so as to unlock said handle, wherein said stopping structure that inhibits unlocking of said handle from said body structure when said body structure is in the folded state prevents unlocking of said handle from said body structure, when said body structure is in the folded state, upon actuation of said operating device.

10. The stroller according to claim 9, wherein said handle locking mechanism includes
(i) a stopping projection provided on an outer surface of said body structure, and
(ii) a stopping member having a groove that is adapted to engage said stopping projection, said stopping member being supported on said handle for sliding movement along an axis of said handle and being biased in a locking direction so as to allow said groove to engage said stopping projection,
such that when said stopping projection is engaged in said groove said stopping projection turns relative to said stopping member as a condition of said body structure changes between the folded state and the unfolded state, and
such that a condition of engagement of said stopping projection and said groove changes according to an angular position of said stopping projection relative to said groove.

11. The stroller according to claim 10, wherein said stopping projection includes
(i) a shaft part, with said groove being adapted to engage said stopping projection by engaging said shaft part such that said shaft part turns relative to said stopping member, when said shaft part is engaged by said groove, as the condition of said body structure changes between the folded state and the unfolded state, and
(ii) an end part, on an end of said shaft part, that is to extend in a direction parallel to the axis of said handle when said stopping projection is at a first position corresponding to when said body structure is in the unfolded state, and is to extend in a direction perpendicular to the axis of said handle when said stopping projection is at a second position corresponding to when said body structure is in the folded state, and
said groove includes a stepped part that is to come into contact with said end part so as to restrain said stopping member from movement in an unlocking direction when said stopping projection is at the second position,
with a combination of said end part and said stepped part corresponding to said structure that permits unlocking of said handle from said body structure only when said body structure is in the unfolded state and inhibits unlocking of said handle from said body structure when said body structure is in the folded state.

12. The stroller according to claim 11, wherein said end part is elliptical in shape.

13. The stroller according to claim 12, wherein said operating device is on said handle, and further comprising:
a connecting member extending along said handle, said connecting member having one end connected to said stopping member and another end connected to said operating device,
wherein said connecting member is operable to be pulled upon actuation of said operating device so as to move said stopping member, biased in the locking direction, in an unlocking direction that is opposite to the locking direction.

14. The stroller according to claim 11, wherein said operating device is on said handle, and further comprising:
a connecting member extending along said handle, said connecting member having one end connected to said stopping member and another end connected to said operating device,
wherein said connecting member is operable to be pulled upon actuation of said operating device so as to move said stopping member, biased in the locking direction, in an unlocking direction that is opposite to the locking direction.

15. The stroller according to claim 10, wherein said operating device is on said handle, and further comprising:
a connecting member extending along said handle, said connecting member having one end connected to said stopping member and another end connected to said operating device,
wherein said connecting member is operable to be pulled upon actuation of said operating device so as to move said stopping member, biased in the locking direction, in an unlocking direction that is opposite to the locking direction.

16. The stroller according to claim 1, wherein said handle locking mechanism includes
(i) a stopping projection provided on an outer surface of said body structure, and
(ii) a stopping member having a groove that is adapted to engage said stopping projection, said stopping member being supported on said handle for sliding movement along an axis of said handle and being biased in a locking direction so as to allow said groove to engage said stopping projection,
such that when said stopping projection is engaged in said groove said stopping projection turns relative to said stopping member as a condition of said body structure changes between the folded state and the unfolded state, and
such that a condition of engagement of said stopping projection and said groove changes according to an angular position of said stopping projection relative to said groove.

17. The stroller according to claim 16, wherein said stopping projection includes
(i) a shaft part, with said groove being adapted to engage said stopping projection by engaging said shaft part such that said shaft part turns relative to said stopping member, when said shaft part is engaged by said groove, as the condition of said body structure changes between the folded state and the unfolded state, and
(ii) an end part, on an end of said shaft part, that is to extend in a direction parallel to the axis of said handle when said stopping projection is at a first position corresponding to when said body structure is in the unfolded state, and is to extend in a direction perpendicular to the axis of said handle when said stopping projection is at a second position corresponding to when said body structure is in the folded state, and said groove includes a stepped part that is to come into contact with said end part so as to restrain said stopping member from movement in an unlocking direction when said stopping projection is at the second position, with a combination of said end part and said stepped part corresponding to said structure that permits unlocking of said handle from said body structure only when said body structure is in the unfolded state and inhibits unlocking of said handle from said body structure when said body structure is in the folded state.

18. The stroller according to claim 17, wherein said end part is elliptical in shape.

19. The stroller according to claim 18, further comprising:

an operating device on said handle; and a connecting member extending along said handle, said connecting member having one end connected to said stopping member and another end connected to said operating device, wherein said connecting member is operable to be pulled by said operating device so as to move said stopping member, biased in the locking direction, in an unlocking direction that is opposite to the locking direction.

20. The stroller according to claim 17, further comprising:

an operating device on said handle; and a connecting member extending along said handle, said connecting member having one end connected to said stopping member and another end connected to said operating device, wherein said connecting member is operable to be pulled by said operating device so as to move said stopping member, biased in the locking direction, in an unlocking direction that is opposite to the locking direction.

21. The stroller according to claim 16, further comprising:

an operating device on said handle; and a connecting member extending along said handle, said connecting member having one end connected to said stopping member and another end connected to said operating device, wherein said connecting member is operable to be pulled by said operating device so as to move said stopping member, biased in the locking direction, in an unlocking direction that is opposite to the locking direction.

* * * * *